United States Patent [19]

MacDonald Bruce G. et al.

[11] Patent Number: 4,944,580
[45] Date of Patent: Jul. 31, 1990

[54] ACTIVE SEGMENTED MIRROR INCLUDING A PLURALITY OF PIEZOELECTRIC DRIVERS

[75] Inventors: MacDonald Bruce G.; William G. Hulburd; Raymond A. LaBelle, all of San Diego, Calif.

[73] Assignee: Thermo Electron Technologies Corp., San Diego, Calif.

[21] Appl. No.: 225,092

[22] Filed: Jul. 27, 1988

[51] Int. Cl.$^5$ .......................... G02B 7/18; G02B 5/08; G01V 1/20
[52] U.S. Cl. .................. 350/611; 250/201.1; 310/328
[58] Field of Search .............. 350/611, 613, 360; 310/328, 330, 331, 332, 366, 369; 250/201

[56] References Cited

U.S. PATENT DOCUMENTS

| | | | |
|---|---|---|---|
| 3,146,367 | 8/1964 | McNaney | 310/331 |
| 3,904,274 | 9/1975 | Feinleib | 350/161 |
| 4,087,715 | 3/1978 | Myer | 310/328 |
| 4,202,605 | 5/1990 | Heinz | 350/292 |
| 4,588,268 | 5/1986 | Aldrich | 350/360 |
| 4,655,563 | 4/1987 | Plunte et al. | 350/611 |
| 4,657,358 | 4/1987 | Anthony et al. | 350/611 |
| 4,674,848 | 6/1987 | Aldrich et al. | 350/611 |
| 4,679,915 | 7/1987 | Kriz et al. | 350/611 |
| 4,785,177 | 11/1988 | Besocke | 310/328 |
| 4,825,062 | 4/1989 | Rather et al. | 350/611 |

OTHER PUBLICATIONS

Sol L. Morrison, "Development . . . ", *SPIE Journal*, vol. 8, May, 1970, pp. 107–113.

*Primary Examiner*—Jon W. Henry

[57] ABSTRACT

A low cost segmented mirror for making wavefront corrections. The segmented mirror is comprised of a large number of closely spaced mirror element assemblies. Each assembly is comprised of an essentially flat mirror surface backed by a substrate and a tubular shaped piezoelectric driver divided axially into at least three parts each part having its own independent voltage source. The independent voltages sources are variable over a voltage range including zero volts. Each driver is attached at one of its ends to a base support. During fabrication, the segmented mirrors are held in place on an essentially flat vacuum chuck while the other ends of the drivers are attached to the mirror substrates with an epoxy. The result is an essentially flat segmented mirror surface when the independent voltage sources are at zero volts. Wavefront corrections are produced by varying the voltage to each individual part of each piezoelectric driver so as to adjust each of the segmented mirror surfaces in tilt, tip, and piston.

5 Claims, 4 Drawing Sheets

ACTIVE SEGMENTED MIRROR INCLUDING A PLURALITY OF PIEZOELECTRIC DRIVERS

This invention relates to deformable mirror systems and in particular to active segmented mirrors. This invention was made with Goverment support under various contracts awarded through the Department of Defense. The Goverment has certain rights in this invention.

BACKGROUND OF THE INVENTION

Light passing through the earth's atmosphere becomes distorted. It is known that this distortion can be removed with wavefront phase modulators. These are generally deformable or segmented mirrors. Segmented mirrors typically have a large number of closely spaced discrete mirror elements. These elements are adjusted in position to apply a correction to the wavefront.

It is known to use piezoeletric drivers to provide for rapid adjustment of these elements.

SUMMARY OF THE INVENTION

The present invention provides a low segmented mirror for making wavefront corrections. The segmented mirror is comprised of a large number of closely spaced mirror element assemblies. Each assembly is comprised of an essentially flat mirror surface backed by a substrate and a tubular shaped piezoelectric driver axially into at least three parts each part having its own independent voltage source. The independent voltages sources are variable over a voltage range including zero volts. Each driver is attached at one its ends to a base support. During fabrication the segment mirrors are held in place on an essentially flat vacuum chuck while the other ends of the drivers are attached to the mirror substrates with an epoxy. The result is an essentially flat segmented mirror surface when the independent voltage sources are at zero volts. Wavefront corrections are produced by varying the voltage to each individual part of each piezoelectric driver so as to adjust each of the segment mirror surfaces in tilt, tip, and piston.

BRIEF DESCRIPTION OF THE DRAWINGS

FIG. Is a drawing showing the face of a preferred embodiment.

FIG. 6 Is a drawing showing a preferred embodiment of the present invention.

DETAILED DESCRIPTION OF PREFERRED EMBODIMENTS

The present invention provides a segmented mirror with excellent optical figure, wavefront fitting, and dynamic performance as well as relatively low cost. With the present invention it is now practical to produce at relatively low cost segmented wavefront correctors with more than 10,000 segments for compensation of short wavelength systems with apertures of 4 m and beyond.

Description

Figure 1:
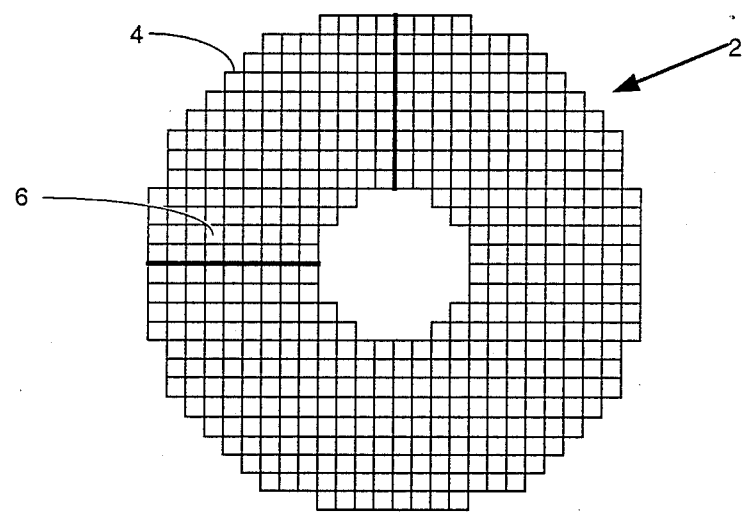
Figure 2:
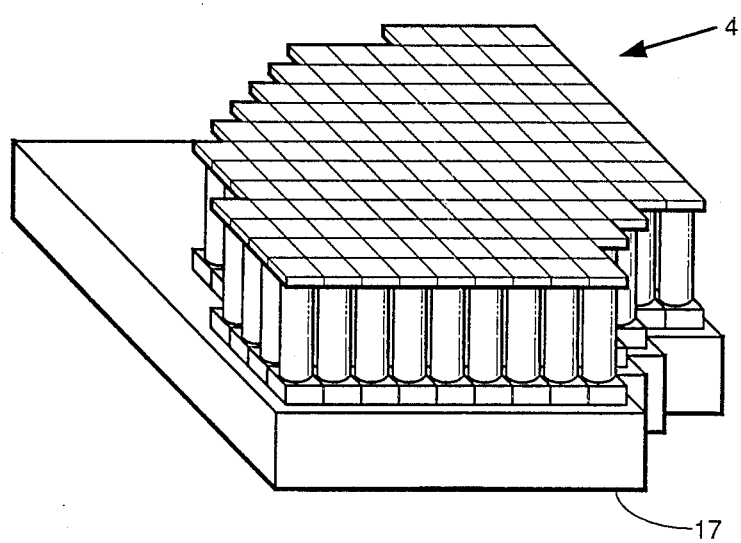
FIG. 2 Is an isometric drawing of one four modules of a preferred embodiment.
Figure 3:
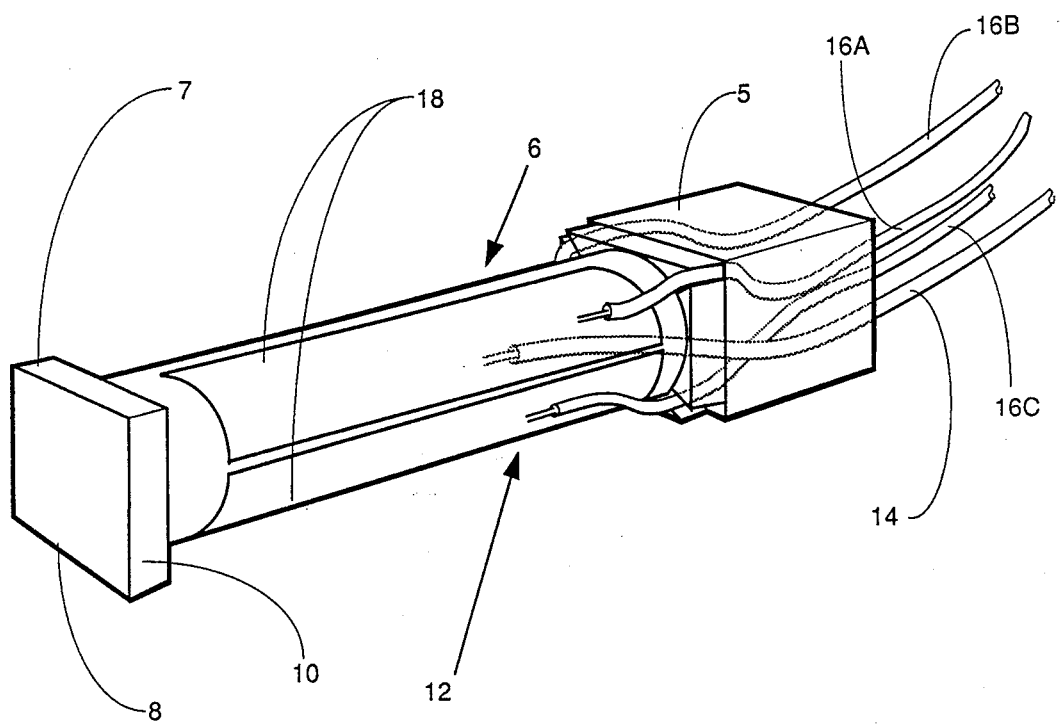
FIG. 3 Is an isometric drawing of a mirror element assembly.

A preferred embodiment of the present invention is described by reference to the figures. FIG. 1 is a sketch showing the mirror surface of a 496 segment segmented mirror 2. It is comprised of four modules 4, each which in turn are comprised of 124 mirror element assemblies 6. An isometric sketch of one of the modules 4 is shown in FIG. 2. A mirror element assembly 6 is shown in FIG. 3. It is comprised of mirror element 7 comprised of mirror surface 8, mirror substrate 10, piezoelectric driver 12 and four electrical leads 14 and 16A, 16B, and 16C. The piezoelectric driver is basically an annular tube, 0.8 inch long with the ¼ inch outside diameter and a 0.200 inch inside diameter. It is covered essentially completely on the inside diameter with glass filled nickel electrode and almost completely on the outside with the same material; however, the electrode material has been removed in three narrow axial strips 18 so as to separate the electrode on the outside into 3 separate parts. Electrical leads 16A, 16B, and 16C are attached to these segments and electrical lead 14 is attached to the electrode material covering the inside surface.

In this preferred embodiment mirror surface 8 is 0.3 inch ×0.3 inch. The 496 segments produce a segmented surface as shown in FIG. 1 having a generally circular shape with a diameter of about 20 cm.

In this preferred embodiment as shown in FIG. 2, 124 mirror assemblies are mounted on a single mounting block 17 to produce a module 4.

Wavefront Fitting

Each segment of the segmented mirro can be independently adjusted in tip, tilt, and piston to approximate a smooth and continuous wavefront. Given an aperture filled with an array of vanishingly small segments it would be possible to exactly match the desired wavefront shape. And with an economically feasible numbers of segments, it is possible to provide a segmented mirror which approaches an ideal wavefront corrector. For example, the fitting error for an aberration with a Kolmogorov spectrum is given by $$\Delta\phi^2 = 0.18\left(\frac{d}{r_o}\right)^{5/3}$$

where $\Delta\phi^2$ is the wavefront rms phase error in radians, d is the segment diameter and $r_o$ is the atmospheric coherence length. For a value $(d/r_o)=1$ the resultant Strehl contribution is 0.84. In the absence of external aberrations the segmented mirror is capable of Strehl performance in excess of 0.90.

The Effect of Segment-to-Segment Gaps

In general the discontinuities caused by segment gaps are of minor impact on overall segmented mirror performance. There are two prinipal optical effects caused by the gaps, these are
  a loss of energy through the gaps, in proportion to the ratio of gap area to segment area;
  diffraction of energy from the central lobe of the diffration pattern, also in proportion of the ratio of gap area to segment area.

There is no appreciable broadening of the central lobe of the diffraction pattern due to moderately small gaps. The loss is equivalent to twice the ratio of gap area to segment area. The bulk of the energy diffracted by the gaps goes into a series of spots on orthogonal lines extending out from the central lobe. The spots are very dim compared with the central lobe, and they have spatial frequencies in multiples of the segment sized features of the mirror. These spots extend a long way out from the central lobe and typically visible for distance three orders of magnitude greater than the width of the central lobe.

Operation with n-λ Longitudinal Truncation

One importance feature of segmented mirrors is their ability to operate with n-λ longitudinal truncation. This invention takes advantage of this fact with substantial cost savings for many applications. In applications where the wavefront of narrowband radiation is to be corrected, the segment stroke can be reduced to as little as plus of minus one half wave ($\pm\lambda/2$) and still operate effectively. This may create a wavefront with discrete phase steps at segments boundaries. However, if these steps are made to be exactly an integer number of waves the reflected wavefront will phase properly, and the mirror will have diffraction limited optical performance. The fitting error associated with the use of broad band radiation with a segmented mirror with n-λ steps is given by $$\Delta\mu^2 = (2\pi n_{rms})^2 \left(\frac{\Delta\lambda}{\lambda}\right)^2$$

where $n_{rms}$ is the number of wave steps used to keep the segments in a $\pm\lambda/2$ range. It is possible to operate in an n-λ mode with moderate fitting errors for laser line widths on the order of several nanometers. Segmented mirrors operating in an n-λ mode can utilize actuators with reduced stroke and increased stiffness to improve dynamic performance and reduce cost. It also relaxes segment-to-segment piston alignment requirements, simplifies fabrication, and extends the effective tilt correction range of the wavefront corrector without increasing actuator stroke.

Actuation of the Segments

The segmented mirror in accordance with the present invention uses a tubular piezoelectric actuator with three degrees of freedom per segment, providing each segment with independent control of piston, tip, and tilt. The actuators are made from a ceramic material which exhibits the piezoelectric effect. Lead zirconate-lead titanate is a preferred piezoelectric material. When an electric field is applied across the piezoelectric material the resultant dislocation of charge centers cause the material to change shape. For the tabulator actuators used a voltage applied between the electrodes on the interior and exterior surfaces of the tube causes a change in the length. A preferred voltage range is ±120 volts; however the drivers are capable of ranges as high as ±500 volts. The change is a relatively small fraction of the materials dimension and is roughly proportional to the applied voltage. The effect is virtually instantaneous and response time is predominantly limited by the drive electronics and resonances in the actuator and support structure. The exterior electrode is divided into three electrically isolated domains each covering most of a 120° sector that extends the length of the tube. Different combinations of voltage between the three electrodes and the common interior electrode affect the changes in piston, tip, and tilt desired.

Dynamic Performance

The segmented mirror of the present invention may be used in an open loop mode or closed loop mode. For the open loop mode, the appropriate correction is first determined, than the drive signal to the segmented mirror is updated and the segmented mirror moves to that position. No positional feedback is needed to linearize the mirrors response, it will move directly to the commanded position. Operation of the segmented mirror in an open loop mode can significantly simplify system design, particularly for a pulsed laser system. However, it stresses the performance of the actuators and the mounting of the segments to the actuators. To operate effectively in this mode the actuators length must change linearly with applied voltage, and the piston, tip, and tilt movements of the segment must be a linear sum of the three actuator lengths. Prototype segmented mirrors produced by the inventors and their coworkers have demonstrated open loop positioning performance more than adequate for atmospheric compensation applications. The linearity that makes it possible to operate open loop can greatly enhance closed loop performance as well.

Segmented mirrors in accordance with the present invention have excellent dynamic properties. Because each segment can move independently of all the others there is no actuator preloading or cross coupling between segments. Response times better than 100 $\mu$S suggests that this segmented mirror has a potential for closed loop bandwidths on the order of 10 KHz. In closed loop control systems higher loop bandwidth can translate directly to increased loop-gain and reduced loop tracking errors.

Fabrication of Segments and Coatings

Segments can be made that have the best possible figure, finish, and coating present technology can provide. Particular system parameters will dictate what materials and size are optimal for an application. The segments may be prepared using any of many procedures available to optical shops. Their small size enables a shop to polish and coat them in several low risk batches and makes it possible to obtain segments from multiple vendors. Inferior parts may be rejected at a low value-added stage of the fabrication and so insure production of a high quality segmented mirror.

Coatings used on segmented mirrors may be produced using techniques which are inherently superior those that can be applied to large aperture monolithic deformable mirrors. Reasonable choices for segment substrate materials place no restrictions on the use of high vacuum or elevated temperatures. Coaters can deposit any of the currently available materials in any enviroment they choose. By comparison, present technology monolithic deformable mirrors are coated near the last stages of assembly. Outgassing and temperature limits on non-optical materials present limitations on temperatures and vacuum that reduce overall coating quality.

Temperature is one of the most important variables controlled during the deposition of a high energy coating. Higher temperatures generally yield a better coating provided the substrate is not damaged by the heat. Coating quality is best when the chamber temperature is above the melting point of the elemental material being deposited. Many coatings are deposited at temperatures around 225° C. for optimum overall performance. However, PZT actuators present in the chamber during monolithic deformable mirror coating may depolarize at temperatures as low as 115°–120° C. Elevatin to temperatures beyond this will substantially diminish an actuators piezoelectric sensitivity. Low temperature coating techniques applicable to monolithic deformable mirrors tend to perform poorly and are applied with greater difficulty. Sputtering techniques may be used at lower temperatures, however deformable mirrors require the coating to be applied uniformly over larger areas. It becomes increasingly difficult to monitor the entire surface and deposit material uniformly with larger apertures.

With segmented mirrors made in accordance with the present invention, a substrate such as silicon can be heated to very high temperatures with ultra high vacuum. At these tempertures the coatings are harder, more uniform, have lower density of scatter centers, less absorption, and better adhesion to the substrate. This has many advantages for the system including maximizing damage threshold capablities, minimizing cooling requirements, easier cleaning and improved durability.

Segmented Mirror Modules

Segmented mirros are preferably assembled from modules containing complete sets of segments and actuators. The inventors and their coworkers have produced worked modules from 4×4 to 14×14 segments and used as many as 44 modules in one segmented array.

Module Assembly

Figure 5:
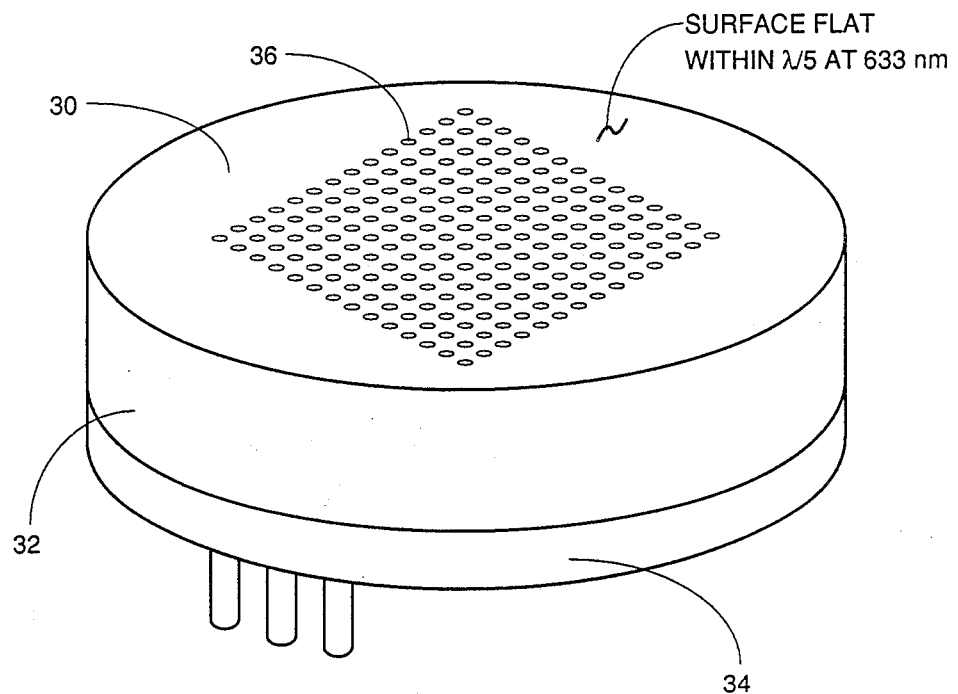
FIG. 5 Is a drawing of a vacuum chuck.

A preferred method of assembly can be described by reference to FIGS. 5, 6 and 7. This method utilizes vacuum chuck 30 shown in FIG. 5. Vacuum chuck 30 is comprised of fused silica plate 32 which is about 6 in. in diameter and about 2 in. thick and a pyrex backing plate 34 banded to silica plate 32. These are a grid of 14×14 0.093 diameter holes 36 drilled through silical plate 32 and 14 leaders 38 are cut in pyrex plate. Each leader connects 14 holes and is also connected to a vacuum fitting as shown in FIG. 6. To assemble a module, mirror element assemblies (except for mirror element 7) are first bonded to mounting block 17. Mirror elements 7 are then placed on over vacuum holes 36. A vacuum drawn by vacuum pump 40 holds the mirror element assemblies in place while the rest of the module is bonded to mirror elements 7 with epoxy as shown at 42 in FIG. 6.

The vacuum drawn by vacuum pump 40 holds the mirror surface or mirror elements 7 flat within 1.5 wavelengths at 633 nm until the epoxy at 42 is completely dry. The flatness of the surfaces of mirror elements 7 is preferably monitored several times during the drying process by viewing the mirror with 633 nm HeNe laser light to check for fringes on the mirror surface.

Figure 4:
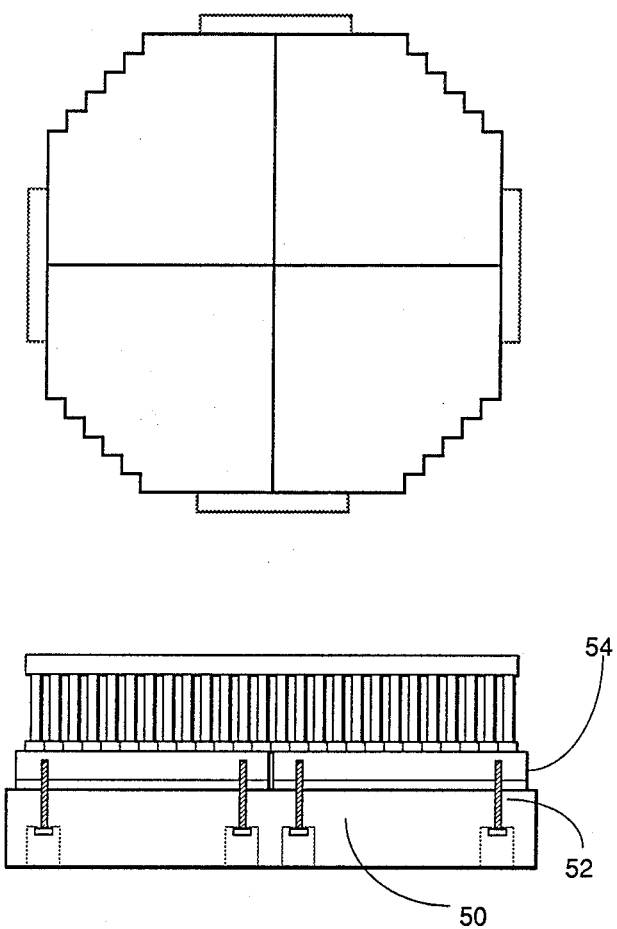
FIG. 4 Is a drawing showing a preferred method of assembling a segmented mirror from four modules.

After the epoxy is completely dry, vacuum pump 40 is shut off and module 4 is removed. The complete module is shown in FIG. 2. The mirror surfaces are flat within about 1.5λ at 633 nm with zero voltage applied to leads 14 and 16A, and 16B, and 16C. Four modules 4 are mounted together as shown in FIG. 4 on base plate 50. Flexible pad 54 comprised of neoprene is sandwiched in between base plate 50 and mounting block 17. Three adjustment screws 52 are used with each module to align the 4 module so that the mirror surfaces of all the mirror elements are essentially flat with respect to each other at zero voltage.

While this invention has been described in terms of a specified embodiment of a four-module segmented mirror, it is to be understood that many other alternative designs could be developed using the concepts of this invention. For example, many more module could be joined together to make a much larger segmented mirror. The scope of the described invention is determined by the appended claims.

We claim:

1. A segmented mirror for making wavefront corrections comprising:
   a mounting block,
   a plurality of piezoelectric drivers, each driver having a generally tubular shape defining an axis, and a first end and a second end and comprising outside and inside electrically conducting surfaces said conducting surface being fabricated to define at least three axial piezoelectric segments each segment having its own independent voltage source, each voltage source having a voltage range including zero volts, so as to provide tilt, tip, and piston piezoelectric motion for said driver,
   a plurality of segment mirror elements each such mirror element comprised of an essentially flat mirror surface and a mirror substrate,
   said plurality of piezoelectric drivers being attached to said mounting block and said plurality of segment mirror elements being attached one each to said plurality of piezoelectric drivers in such a manner as to produce an essentially flat segmented mirror when all of said independent voltages sources are at zero voltage.

2. A segmented mirror in accordance with claim 1 and further comprising
   a base plate,
   additional mounting blocks and additional piezoelectric drivers with segmented mirror elements attached to such additional mounting blocks,
   leveling means for mounting all of said mounting blocks on said base plates so as to produce as essentially flat segmented mirror when all of said independent voltages sources are zero voltage.

3. A segmented mirror in accordance with claim 2 wherein said leveling means comprises a plurality of leveling screws and a flexible pad, said pad being mounted between said base plate and said mounting blocks.

4. A segmented mirror accordance with claim 1 wherein said inside electrical conducting surface comprises an electrical conducting material coating essentially the entire inside surface of said driver and said outside electrical conducting surface is comprised of an electrical conducting material coating essentially the entire outside surface of said driver except for three gaps running the length of said driver parallel to the axis of the driver.

5. A segmented mirror in accordance with claim 4 wherein the electrical conducting material is glass filled nickel electrode.

* * * * *